(12) United States Patent
Xu et al.

(10) Patent No.: US 11,105,602 B2
(45) Date of Patent: Aug. 31, 2021

(54) RIGHT-ANGLE TOUCH GAUGE

(71) Applicant: CITIC Dicastal CO., LTD, Qinhuangdao (CN)

(72) Inventors: Zuo Xu, Qinhuangdao (CN); Guoyuan Xiong, Qinhuangdao (CN); Bowen Xue, Qinhuangdao (CN); Xueqiang Li, Qinhuangdao (CN); Baojun Cui, Qinhuangdao (CN); Jiandong Guo, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 228 days.

(21) Appl. No.: 16/384,225

(22) Filed: Apr. 15, 2019

(65) Prior Publication Data
US 2020/0003537 A1  Jan. 2, 2020

(30) Foreign Application Priority Data

Jul. 2, 2018 (CN) .......................... 201810706009.2

(51) Int. Cl.
*G01B 3/22* (2006.01)
*G01B 3/26* (2006.01)
*G01B 5/14* (2006.01)

(52) U.S. Cl.
CPC .................. *G01B 3/22* (2013.01); *G01B 3/26* (2013.01); *G01B 5/14* (2013.01)

(58) Field of Classification Search
CPC ... G01B 3/22; G01B 3/26; G01B 3/46; G01B 5/14

USPC ....... 33/556, 1 BB, 709, 783, 792, 794, 802, 33/803, 806, 542

See application file for complete search history.

(56) References Cited

U.S. PATENT DOCUMENTS

| | | | | | |
|---|---|---|---|---|---|
| 2,454,246 | A | * | 11/1948 | Worthen | G01B 5/08 33/542 |
| 2,553,086 | A | * | 5/1951 | Haidegger | G01B 5/12 33/806 |
| 2,802,274 | A | * | 8/1957 | Martin | G01B 5/12 33/542 |
| 3,323,217 | A | * | 6/1967 | Russell | G01B 3/306 33/794 |

(Continued)

FOREIGN PATENT DOCUMENTS

| CN | 201844832 U | 5/2011 |
|---|---|---|
| CN | 105890499 A | 8/2016 |

*Primary Examiner* — Christopher W Fulton
(74) *Attorney, Agent, or Firm* — Calfee, Halter & Griswold LLP

(57) ABSTRACT

A right angle touch gauge of the present application includes a fixing block, a floating column, a spring, a measuring column, a measuring sleeve and the like. In use, round head of top end of the floating column is in contact with bottom surface of work piece. The floating column is compressed downward when it touches high surface of the bottom surface of the work piece, the measuring column is compressed to right by matching lower cone of the floating column and left cone of the measuring column, and it may be found whether height difference between high surface and low surface of the bottom surface of the work piece is qualified by observing whether end edge of the right cylinder of the measuring column is placed between steps of right end surface of the measuring sleeve.

1 Claim, 1 Drawing Sheet

(56) References Cited

U.S. PATENT DOCUMENTS

| | | | | |
|---|---|---|---|---|
| 4,265,026 | A * | 5/1981 | Meyer | G01B 3/26 |
| | | | | 33/501.4 |
| 4,288,924 | A * | 9/1981 | Mizuno | G01B 5/12 |
| | | | | 33/543 |
| 4,476,634 | A * | 10/1984 | Yamamoto | G01B 3/26 |
| | | | | 33/501.4 |
| 4,892,449 | A * | 1/1990 | Croxton | B25B 31/005 |
| | | | | 269/48.3 |
| 4,930,226 | A * | 6/1990 | Shindelar | G01B 3/30 |
| | | | | 33/655 |
| 7,171,760 | B1 * | 2/2007 | Lemon | B23D 59/002 |
| | | | | 33/628 |
| 7,559,150 | B2 * | 7/2009 | Fernandez | A61B 5/103 |
| | | | | 33/512 |
| 10,760,890 | B2 * | 9/2020 | Xue | G01B 5/14 |
| 10,823,544 | B2 * | 11/2020 | Xue | G01B 5/061 |

\* cited by examiner

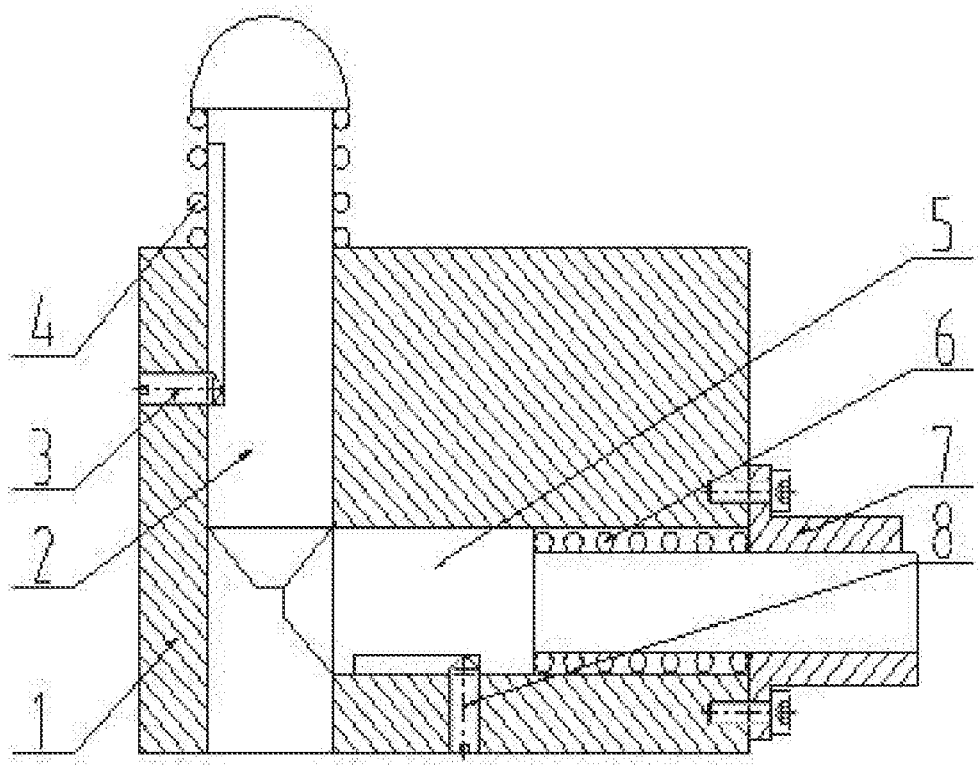

RIGHT-ANGLE TOUCH GAUGE

CROSS-REFERENCE TO RELATED APPLICATIONS

This application claims priority to Chinese Patent Application No. 201810706009.2, filed on Jul. 2, 2018, which is hereby incorporated by reference in its entirety.

TECHNICAL FIELD

The present application relates to a touch gauge, and more particularly to a touch gauge which may measure a height difference between a high and a low surfaces on a bottom surface of a work piece.

BACKGROUND ART

In the field of machining automotive parts, on the bottom surface of some large work pieces, it is often required to measure the height difference between the high and low surfaces on the bottom surface. Measurements are usually made by a coordinate measuring machine (CMM), but this measurement is very inefficient and not suitable for mass production.

SUMMARY OF THE INVENTION

It is an object of the present application to provide a tapered hole position gauge which may measure the tapered hole position of a wheel bolt hole.

In order to achieve the above object, the technical solution of the present application: Right-angle touch gauge, includes a fixing block, a floating column, an upper screw, an upper spring, a measuring column, a lower spring, a measuring sleeve and a lower screw. The lower cylindrical portion of the floating column is matched with a vertical hole in the fixing block. The upper screw is fixed to the left side of the fixing block, and the top end of the upper screw is matched with a slot in the floating column. The upper spring is sleeved on the outer side of the cylinder of the floating column, and is placed above the fixing block. The left cylinder of the measuring column is matched with a transverse hole of the fixing block. The lower screw is fixed in the lower portion of the fixing block, and the top end of the lower screw is matched with a slot in the measuring column. The measuring sleeve is fixed to the right side of the fixing block and is matched with the right cylinder of the measuring column. The lower spring is sleeved on the right cylinder of the measuring column, and is placed on the left side of the measuring sleeve. The top end of the floating column is a round head and the bottom end thereof is a degree cone.

The left side of the measuring column is a degree cone, and the edge of the right side is kept at a sharp angle. The cone of the lower end of the floating column is matched with the left cone of the measuring column. The edge of an inner hole of the measuring sleeve is kept at a sharp angle.

During the operation, top end round head of the floating column is in contact with the bottom surface of the work piece. The floating column is compressed downward when it contacts the high surface of the bottom surface of the work piece, the measuring column is compressed to the right by matching the lower cone of the floating column with the left cone of the measuring column, and it may be found whether the height difference between the high surface and the low surface of the bottom surface of the work piece is qualified by observing whether the end edge of the right cylinder of the measuring column is placed between the steps of the right end surface of the measuring sleeve.

The invention may measure the height difference between the high surface and low surface on the bottom surface of the work piece in use, and has the characteristics of simple structure, convenient use, high measurement efficiency and low production cost.

BRIEF DESCRIPTION OF DRAWINGS

FIG. 1 is a front view of a right angle touch gauge of the present invention.

In figures: 1—fixing block, 2—floating column, 3—upper screw, 4—upper spring, 5—measuring column, 6—lower spring, 7—measuring sleeve, 8—lower screw.

DETAILED DESCRIPTION OF THE INVENTION

The details and operation of a specific device according to the present application will be described below with reference to the accompanying drawings.

The device includes a fixing block 1, a floating column 2, an upper screw 3, an upper spring 4, a measuring column 5, a lower spring 6, a measuring sleeve 7 and a lower screw 8. The lower cylindrical portion of the floating column 2 is matched with a vertical hole in the fixing block 1. The upper screw 3 is fixed to the left side of the fixing block 1, and the top end of the upper screw 3 is matched with a slot in the floating column 2. The upper spring 4 is sleeved on outer side of the cylinder of the floating column 2, and is placed above the fixing block 1. The left cylinder of the measuring column 5 is matched with a transverse hole of the fixing block 1. The lower screw 8 is fixed in the lower portion of the fixing block 1, and the top end thereof is matched with a slot in the measuring column 5. The measuring sleeve 7 is fixed to the right side of the fixing block 1 and is matched with the right cylinder of the measuring column 5. The lower spring 6 is sleeved on the right cylinder of the measuring column 5, and is placed on the left side of the measuring sleeve 7. The top end of the floating column 2 is a round head and the bottom end of the floating column 2 is a 45 degree cone.

The left side of the measuring column 5 is a 45 degree cone, and the edge of the right side is kept at a sharp angle. The cone of the lower end of the floating column 2 is matched with the left cone of the measuring column 5. The edge of an inner hole of the measuring sleeve 7 is kept at a sharp angle.

During the operation, the round head of the top end of the floating column 2 is in contact with the bottom surface of the work piece. The floating column 2 is compressed downward when it contacts the high surface of the bottom surface of the work piece, the measuring column 5 is compressed to the right by matching the lower cone of the floating column 2 with the left cone of the measuring column 5. It can be found whether the height difference between the high surface and the low surface of the bottom surface of the work piece is qualified by observing whether the end edge of the right cylinder of the measuring column 5 is placed between the steps of the right end surface of the measuring sleeve 7. The present application may improve measurement efficiency and meet the requirements for process monitoring in mass production.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. Right-angle touch gauge, comprising: a fixing block, a floating column, an upper screw, an upper spring, a measuring column, a lower spring, a measuring sleeve and a lower screw, lower cylindrical portion of the floating column is matched with a vertical hole in the fixing block, the upper screw is fixed to left side of the fixing block, and top end thereof is matched with a slot in the floating column, the upper spring is sleeved on outer side of cylinder of the floating column, and is placed above the fixing block, left cylinder of the measuring column is matched with a transverse hole of the fixing block, the lower screw is fixed in lower portion of the fixing block, and top end thereof is matched with a slot in the measuring column, the measuring sleeve is fixed to right side of the fixing block and is matched with right cylinder of the measuring column, the lower spring is sleeved on right cylinder of the measuring column, and is placed on left side of the measuring sleeve, top end of the floating column is a round head and bottom end of the floating column is a 45 degree cone;

left side of the measuring column is a 45 degree cone, and edge of right side is kept at a sharp angle, cone of lower end of the floating column is matched with left cone of the measuring column, edge of an inner hole of the measuring sleeve is kept at a sharp angle.

* * * * *